US006286873B1

(12) United States Patent
Seder

(10) Patent No.: US 6,286,873 B1
(45) Date of Patent: Sep. 11, 2001

(54) VISUAL DISPLAY DEVICE WITH CONTINUOUS ANIMATION

(76) Inventor: Rufus Butler Seder, 50 Terminal St., Charlestown, MA (US) 02129

(*) Notice: Subject to any disclaimer, the term of this patent is extended or adjusted under 35 U.S.C. 154(b) by 0 days.

(21) Appl. No.: 09/383,477

(22) Filed: Aug. 26, 1999

(51) Int. Cl.[7] .............................. G09F 19/14; G09B 5/00

(52) U.S. Cl. .............................. 283/117; 40/427; 40/433; 40/435; 40/453; 40/454

(58) Field of Search .............................. 283/117; 40/427, 40/433, 435, 453, 454

(56) References Cited

U.S. PATENT DOCUMENTS

| | | |
|---|---|---|
| 725,567 | 4/1903 | Ives . |
| 762,519 | 6/1904 | Farrand . |
| 829,902 | 8/1906 | Urry . |
| 1,150,374 | 8/1915 | Kanolt . |
| 1,260,682 | 3/1918 | Kanolt . |
| 1,475,430 | 11/1923 | Curwen . |
| 1,838,173 | 12/1931 | Chretien . |
| 1,918,705 | 7/1933 | Ives . |
| 2,045,129 | 6/1936 | Farrand . |
| 2,058,581 | 10/1936 | Fegan . |
| 2,151,301 | 3/1939 | Percy et al. . |
| 2,177,417 | 10/1939 | Eggert . |
| 2,246,001 | 6/1941 | Powers . |
| 2,374,371 | 4/1945 | Morch . |
| 2,876,570 | 3/1959 | Swarbick . |
| 2,915,843 | 12/1959 | Pabst et al. . |
| 2,917,854 | 12/1959 | Swarbick . |
| 2,918,743 | 12/1959 | Swarbick . |
| 3,145,250 | 8/1964 | Vargady . |
| 3,235,987 | 2/1966 | Yates . |
| 3,268,238 | 8/1966 | Finkel . |
| 3,314,179 | 4/1967 | Leach . |
| 3,365,350 | 1/1968 | Cahn . |
| 3,370,371 | 2/1968 | Swarbick . |
| 3,589,045 | 6/1971 | Rakowsky . |
| 3,643,361 | 2/1972 | Eaves . |
| 3,683,525 | 8/1972 | Fukui . |
| 3,745,966 | 7/1973 | Seager . |
| 3,961,434 | 6/1976 | Sampon . |
| 4,263,737 | 4/1981 | Simon . |
| 4,885,193 | 12/1989 | Head . |
| 5,152,089 | 10/1992 | Bellico . |
| 5,695,346 | 12/1997 | Sekiguchi et al. . |
| 5,695,415 | 12/1997 | Docherty et al. . |
| 5,782,026 * | 7/1998 | Capie ..................................... 40/453 |
| 5,823,344 | 10/1998 | Fantone et al. . |

* cited by examiner

*Primary Examiner*—A. L. Wellington
*Assistant Examiner*—Mark T. Henderson
(74) *Attorney, Agent, or Firm*—O'Connell Law Firm

(57) ABSTRACT

A visual display device for providing a continuous, non-reversing animated sequence of displayed images to an observer with a separation member; a plurality of interposed coded images fixed to a first surface of the separation member to form an image member; a plurality of shutter elements fixed to the second surface of the separation member, and a plurality of viewing elements interposed between the plurality of shutter elements to form a shutter member. The coded images, the plurality of shutter elements, and the plurality of viewing elements can share a common orientation and a given pitch. The image member may be transparent except for the plurality of coded images. A strand of flexible material may be provided for suspending the visual display device for continuous rotation.

15 Claims, 4 Drawing Sheets

VISUAL DISPLAY DEVICE WITH CONTINUOUS ANIMATION

FIELD OF THE INVENTION

The present invention relates generally to display devices. Stated more particularly, the present patent discloses and protects a visual display device that employs the principles of parallax displacement to present an observer with a continuously animating image during a continuous rotation of the device.

BACKGROUND OF THE INVENTION

For many years, visual display devices have been known that permit the sequential display of a plurality of coded images by a sequential completion or uncoding of those coded images by a shutter member. These devices can be grouped into two main categories. The first category comprises moveable display devices wherein an image member is slidably retained adjacent to a shutter member to bring about the sequential completion of images while visual display devices that exploit the principles of parallax displacement display a series of images without relative movement form the second category.

In either type of device, a plurality of interposed coded images are disposed on an image member while a shutter member has a plurality of ideally opaque shutter elements disposed thereon. The shutter elements are separated by a plurality of translucent, ideally transparent, viewing elements. Taken alone, the interposed coded images may have the appearance of incoherent narrow strips or, possibly, dots. Further background can be gained by a review of the present inventor's U.S. Pat. No. 5,901,484, which is expressly incorporated herein by reference.

In intended operation, the shutter elements perform dual, equally critical functions. By their opaque nature, the shutter elements are intended to block from view all but one of the interposed coded images, which may be termed an active image. Just as importantly, however, the plurality of shutter elements bridge the gaps between the coded strips that comprise the active image to complete and thereby uncode the active image.

When the image member and the shutter member are moved relative to each other a predetermined amount, either through relative movement or parallax displacement, the strips of the previously active image are concealed whereby the next succeeding coded image assumes the fleeting position as an active image. This phenomenon will continue through a cycle comprising the number of coded images that are disposed on the image member whereupon the first coded image will again appear thereby signaling the start of a new, identical cycle.

In moveable display devices, the sequential image change is accomplished by a sliding of the shutter member relative to the image member, either manually or by machine. In these devices, the observer and the display device need not move relative to one another. The mere sliding of the shutter member relative to the image member is all that is required for displaying a series of images to the observer.

In a markedly different, arguably opposite, manner, visual display devices that are operable without relative movement typically fix the image member relative to the shutter member and display an image change to an observer by creating only the perception of relative movement between the image member and the shutter member, which may be termed a parallax displacement. This parallax displacement can be realized by changing the position of the shutter member relative to the image member from the viewpoint of the observer. Accordingly, devices employing parallax displacement commonly space the shutter member a given distance over the image member and then give the appearance of image change when an observer travels past the device (i.e., the observer walks by the device), when the device travels past an observer (i.e., the device is mounted on a moving vehicle), or when the device is turned about an axis generally parallel to the shared lengthwise orientation of the shutter elements and the coded images. Hereinafter, this axis shall be termed the polar axis of the visual display device.

The astute observer will realize that a given device's ability to display coherent images is inherently dependent on the device's ability to maintain precise registration between the shutter member and the image member. Furthermore, this need for precise registration becomes particularly acute where an increased plurality of images are sought to be displayed because doing so typically demands that the strips comprising the coded images be narrowed to accommodate an increased number of adjacent strips or images.

Accordingly, for many decades, achieving and maintaining precise registration between shutter elements and coded images in image display devices has been a recognized need and an explicit goal of a multiplicity of inventors. Notably, until the invention disclosed and protected by U.S. Pat. No. 5,901,484 to the present inventor, doing so proved to be a challenge that was difficult to meet. Proposed solutions by prior art inventors proved to be undesirably complex, cumbersome, and, in some cases, of dubious effectiveness. However, because movement of the shutter member relative to the image member need not be addressed, achieving and maintaining alignment or registration in visual display devices employing parallax displacement has proven to be a more realizable goal.

Nonetheless, even with alignment achievable and even with a large plurality of such devices disclosed by the prior art, visual display devices employing parallax displacement have suffered and to date continue to suffer from a number of limitations and disadvantages. One principal disadvantage is that such visual display devices are capable of presenting only finite animated sequences to the observer. In prior art displays, the image member is imprinted on semi-translucent material that is designed to catch and maximize the back light to provide a clear image. When so illuminated, these devices may be considered to be partially silhouetted. Stated more particularly, the shutter layer is silhouetted against the illuminated image layer. Unfortunately, because the image member in these traditional displays is semi translucent, not clear, an acceptably crisp image can be perceived only when the image member is behind the shutter layer, never in front. Furthermore, in prior art devices it is a common practice to make the more distant of the shutter elements or the coded images slightly wider in pitch so that the image converges at a given viewing distance. Such displays can not be viewed clearly from the non-converging side regardless of whether the material is translucent or semitranslucent. With this, the image member and the shutter member can not be interchanged, and these prior art devices may well be considered one-sided displays.

Disadvantageously, the one-sided displays of the prior art are limited to a finite image sequence that is displayed with each given amount of parallax displacement. Once the limit of parallax displacement is realized in a one-sided device (i.e., the observer has walked to the end of the display or the display has been rocked through a given angle), further parallax displacement can be achieved only by reversing the previously traveled course and reversing the previously experienced image sequence. Continuous animation is precluded.

Notably, the desirability of achieving continuous animation in a visual display device has been long felt. Accordingly, a number of inventors have attempted to provide just such a display device. For example, the prior art long ago disclosed the zoetrope, which comprises a rotating slotted drum, and the phenakistascope, which comprises a rotating slotted disk. Still further, the prior art reveals a device called a praxinoscope that comprises a rotating drum with a multi-faceted mirrored hub. Advantageously, when rotated, each of these devices present an observer with a continuously animating sequence of images. Disadvantageously, however, these prior art devices are relatively complex in construction and, therefore, limited in use and applicability, expensive to manufacture and sell, and prone to damage and malfunction.

Based on the foregoing, one will appreciate that a visual display device capable of employing parallax displacement to provide a continuous, non-reversing animated sequence would represent a significant advance over the prior art by combining the relative simplicity of a parallax displacement-type visual display device with the enhanced display characteristics typical of more complex prior art devices. Indeed, such a device could reasonably be considered a new, albeit exceedingly and advantageously simple, motion picture machine.

SUMMARY OF THE INVENTION

Advantageously, the present invention is founded on a principal object of providing a visual display device that operates under the concept of parallax displacement to provide a continuous, non- reversing animated sequence of displayed images to an observer.

The present invention has an underlying object of providing a visual display device that displays a plurality of images that are viewable with equal clarity and distinctness from both sides of the visual display device by providing an image member and a shutter member that are completely interchangeable.

An additional underlying object of the invention is to provide a visual display that provides a wholly silhouetted display whereby the device can operate without a need for a dedicated back lighting arrangement.

A further object of the invention is to provide a visual display device that meets the foregoing objects while being exceedingly simple in construction and use.

Another basic object of the invention is to provide a visual display device that maintains a plurality of coded images in exact alignment with a plurality of shutter elements.

Still another object of the invention is to provide a visual display device that can be embodied in a compact structure whereby an observer can readily manipulate the device for viewing image transition.

A still further object of the invention is to provide a visual display device that can be retained and operated in an exceedingly simple and convenient manner.

These and further objects and advantages of the invention will be readily apparent both to one who reviews the present specification and drawings and also to one who has the opportunity to enjoy the use of an embodiment of the present invention.

In accomplishing the aforementioned objects, the present invention for a visual display device with continuous animation is founded on a separation member of a given thickness that has a first surface and an opposing second surface. Preferably, the separation member comprises a transparent panel of material. A plurality of interposed coded images are applied to the first surface of the separation member, and a plurality of shutter elements are fixed to the second surface of the separation member, and a plurality of viewing elements are interposed between the plurality of shutter elements. Ideally, the shutter elements and the coded images will be printed in precise alignment directly on opposite surfaces of the separation member. However, it is possible that they could be printed on separate sheets of transparent substrate, and these sheets of transparent substrate could be affixed as by adhesive or the like to the respective surface of the separation member in precise alignment with each other. In either case, the shutter elements together with the surface to which they are applied form a shutter member, and the coded images together with the surface to which they are applied form an image member.

Preferred embodiments of the invention deviate from prior art visual display devices by providing a wholly silhouetted display meaning that it provides an entire image that appears dark when viewed against a light background. Whereas prior art image members were intentionally designed to catch light by being translucent, the present image member is designed to allow substantially all light to pass through it. As a result, the present visual display device is wholly silhouetted and, unlike the devices of the prior art, does not require a dedicated back lighting arrangement for the images to be viewable. Instead, the images are wholly silhouetted and thus viewable by mere placement of the invention between an observer and a daylit window, a well-lit wall, a light box, or any other appropriate background. Advantageously and unlike the prior art, it is not necessary that any light fall directly on the visual display device itself. Instead, it is desirable that the visual display device does not directly receive light and is displaced from the background surface that does receive incident light.

Preferably, the interposed coded images will share a common orientation and a given pitch, which is proportional to the number of pixels per unit length. Likewise, the plurality of shutter elements and the plurality of viewing elements preferably will have a common orientation and a given pitch. In certain embodiments, the shutter elements and the viewing elements share a common lengthwise orientation with the images displayed by the visual display device. With this, the visual display device typically would be viewed properly with the shutter elements and the viewing elements disposed vertically so that the observer sees the displayed images in an upright disposition. Under this arrangement, each of an observer's eyes would tend to view the visual display device from a slightly different angle such that, at close distances, the observer's eyes could fail to see a clear image.

In the prior art, this angular difference has been accommodated by constructing the element opposite to the expected side of an observer with a wider pitch than the element closer to the observer. With this, the displayed image converges at a given distance on a given side of the display device for clear viewing by an observer. Unfortunately, this practice further exacerbates the one-sided nature of prior art devices because the displayed image is divergent when viewed from the opposite side. As a result, the displayed image is difficult or impossible to perceive from that opposite side of the device.

Advantageously, the present inventor has come to appreciate that the angular difference, and thus the parallax discrepancy, between an observer's eyes become negligible at a given distance such that the eyes nonetheless see a single, clear image even without a converging displayed image. Exploiting this knowledge, the preferred visual display device of the present invention crafts the plurality of interposed coded images with a pitch substantially equal to the pitch of the shutter elements and the viewing elements. With this, the displayed images neither converge nor diverge, and, consequently, they have the same appearance from both sides of the visual display device. However, it should be recognized that it is nonetheless a common practice of at least the present inventor to calibrate the viewing elements to be slightly less wide than the individual coded image strips. This practice can compensate for minor misalignments between the image member and the shutter member while also assisting both eyes of an observer in seeing an identical image.

With the combined advantages that are gained by having the displayed images wholly silhouetted and by having coded images and shutter elements of substantially identical pitch, the coded images and the shutter elements under the present invention are completely interchangeable. As a result, regardless of whether the coded images or the shutter elements are closest to the observer, the ability of the visual display device to display coherent images is not compromised. With this, the invention achieves true two-sided viewability, which to date appears to have evaded the prior art.

It is precisely this two-sided viewability that allows preferred embodiments of the present invention to realize substantially continuous, non-reversing animation. This substantially continuous animation will be demonstrated when a device according to the present invention is rotated continuously about its polar axis such that the observer will view the series of image changes that are displayed as the first side is rotated through substantially 180 degrees and then the observer will view the series of image changes that are displayed as the second side is rotated through substantially 180 degrees. Each 360-degree cycle leads without interruption to another cycle thereby providing continuous animation except, of course, for the brief interruption as the edge of the visual display device passes by and faces the viewer. It will be noted that this is in marked opposition to the non-continuous animation provided by prior art one-sided devices where repeated animation can be achieved only by reversing the previously completed cycle.

It certainly is within the scope of the present invention for continuous rotation of the visual display device to be performed by a motorized arrangement. It is also possible that visual display devices according to the present invention could provide continuous animation by being manually rotated either for viewing by the person performing the rotating or for viewing by other observers. However, the inventor has devised of an inventively simple method for enabling the visual display device to exhibit continuous rotation and, thus, continuous animation. To accomplish this, the visual display device can be rotatably supported by any appropriate means or suspended preferably by a strand of flexible material, such as a string or a length of monofilament. Ideally, the strand of flexible material will retain the visual display device in vertical alignment with the device's center of gravity. With this, the shutter elements and the coded images will be maintained in a vertical orientation, and the device will be freely rotatable. Under this arrangement, continuous rotation can be brought about by an incident breeze or by a user's light touch thereby inducing the continuous animation that contributes to making the present invention unique relative to the prior art.

Of course, one should be mindful that the foregoing discussion is designed merely to outline the more important features of the invention broadly to enable a better understanding of the detailed description that follows and to instill a better appreciation of the inventor's contribution to the art. Before an embodiment of the invention is explained in detail, it must be made clear that the following details of construction, descriptions of geometry, and illustrations of inventive concepts are mere examples of possible manifestations of the invention.

DETAILED DESCRIPTION OF PREFERRED EMBODIMENTS

As with many inventions, the present invention for a visual display device with continuous animation can assume a wide variety of embodiments. However, to assist those reviewing the present disclosure in understanding and, in appropriate circumstances, practicing the present invention, a few particularly preferred embodiments of the visual display device are disclosed herein.

Figure 1:
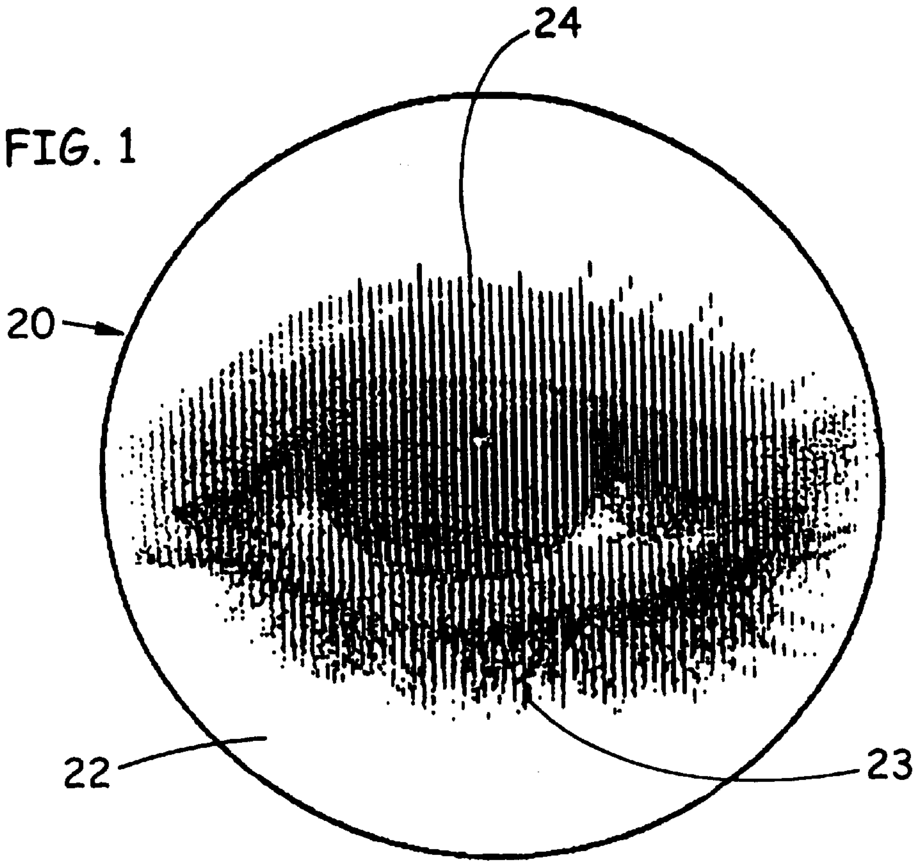
FIG. 1 is a view in front elevation of an image member according to the present invention.

With this in mind and looking more particularly to the accompanying figures, FIG. 1 depicts a preferred embodiment of an image member 20 according to the present invention for a visual display device with continuous animation. In this embodiment, the image member 20 is founded on a transparent sheet 22 that is of a circular configuration. The transparent sheet 22 comprises a sheet of thin, flexible plastic. A plurality of interposed coded images are disposed on the transparent sheet 22 as by printing or any other suitable practice.

As FIG. 1 shows, the plurality of interposed coded images 24 are each formed from a multitude of narrow strips 23. Each strip 23 comprises just a portion of an entire interposed coded image 24. One may note that the strips 23 preferably are generated using a computer. However, albeit less desirable, it would be possible to create the strips 23 by photographic or other techniques.

One skilled in the art will be aware that properly laying out the strips 23 to form coherent images may be considered as much an art as a science. Nonetheless, the general layout of the strips 23 is governed by a relatively simple formula. First, it will be appreciated that one could consider each of N number of complete images to be formed from a plurality of seamless vertical strips with each strip being a pixel wide. One could number the many pixels that together form each complete image in repeated sequences of 1 through N. For the first image, pixels two through N could be removed whereby (N-1)/N of the first image would be removed and only 1/N of the first image would remain. With this, the first image would be coded. The area previously occupied by the removed portions of the first image could then be replaced by 1/N of each of the remaining N-1 images. This would thus form the plurality of interposed coded images 24.

Figure 3:
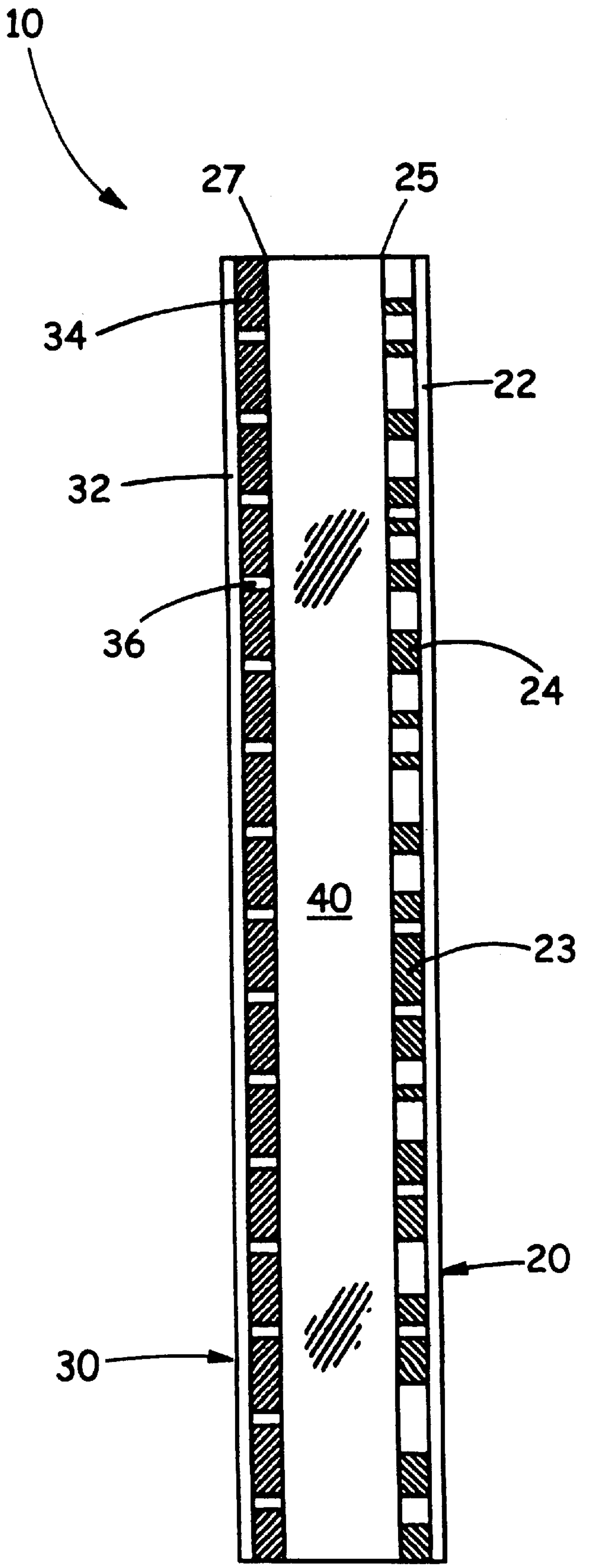
FIG. 3 is a view in cross section of a visual display device with continuous animation according to the present invention taken along the line 3—3 in FIG. 5.

These interposed coded images 24 could then be applied to the image member 20 or directly to the first surface of a separation member, which is indicated at 40 in FIG. 3. Of course, the number N could vary widely within the scope of the present invention. The astute observer will note that the image strips 23 are disposed in immediate, uninterrupted succession. Unlike certain devices of the prior art, they are devoid of any interloping elements. As a result, the display of the coded images 24 can be exacted smoothly and fluidically.

Figure 2:
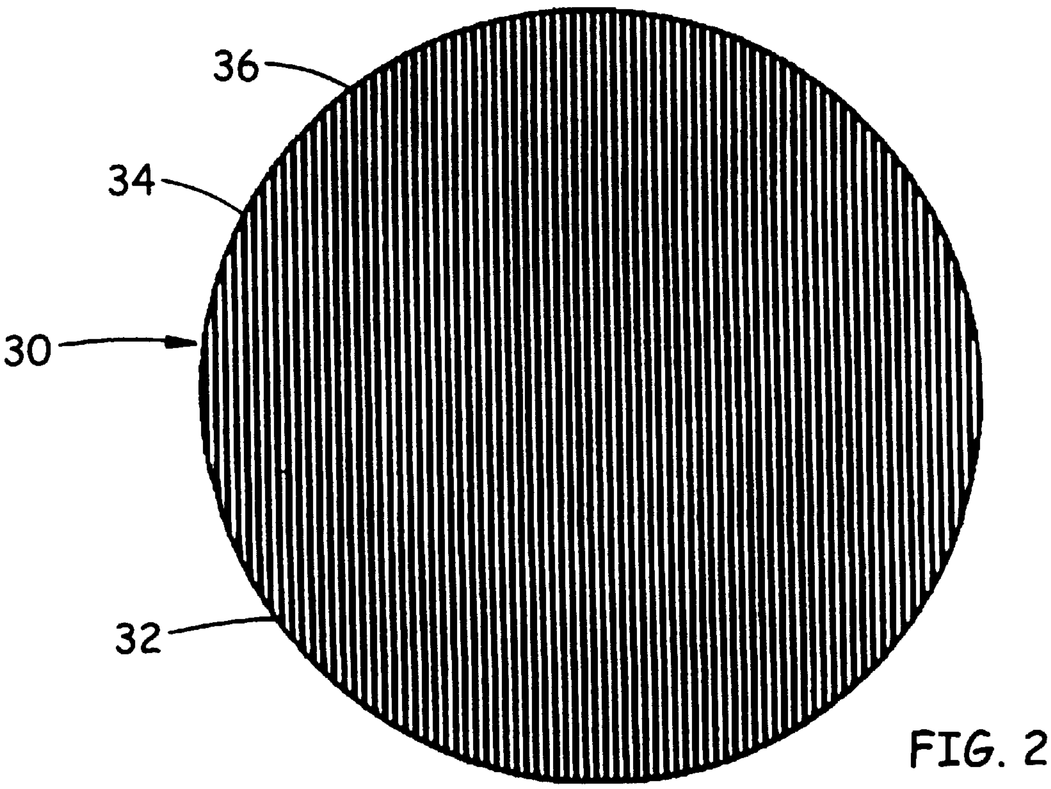
FIG. 2 is a view in front elevation of a shutter member according to the present invention.

Looking to FIG. 2, one sees a shutter member according to the present invention indicated generally at 30. Like the image member 20, the shutter member 30 is based on a transparent sheet 32. Again, the transparent sheet 32 is cut to a circular configuration from a sheet of thin and flexible transparent plastic. However, instead of the plurality of coded images 24 that are on the transparent sheet 22 of the image member 20, the transparent sheet 32 has a plurality of opaque shutter elements 34 that are printed thereon or otherwise applied thereto. Interposed between the shutter elements 34 is a plurality of clear viewing elements 36. In this case, the viewing elements 36 merely comprise portions of the transparent sheet 32 that are devoid of the shutter elements 34. Recalling the manner in which the image strips 23 were laid out, the shutter elements 34 and the viewing elements 36 would be applied to the transparent sheet 32 or directly to the second surface 27 of the separation member 40 in a repeated series of N-1 opaque lines followed by 1 clear line.

In FIG. 3, a complete visual display device with continuous animation is indicated generally at 10. In FIG. 3, the visual display device 10 is depicted in a cross section taken along the line 3—3 in FIG. 5, which will be discussed more fully below. As FIG. 3 shows, in the visual display device 10 of this preferred embodiment, the image member 20 and the shutter member 30 are affixed to opposing sides of a means for retaining the image member 20 and the shutter member 30 in a spaced relationship. In this embodiment, the means for retaining the image member 20 and the shutter member 30 in a spaced relationship comprises a separation member 40 in the form of a disk, which is also indicated at 40. The disk 40 is preferably formed from a transparent material such as glass, clear acrylic, or any other suitable material. The image member 20 is affixed to a first surface 25 of the separation member 40, and the shutter member is affixed to a second surface 27 of the separation member 40. With this, the separation member 40 maintains the image member 20 and the shutter member 30 in an accurately spaced relationship for facilitating parallax displacement.

Although the separation member 40 in this embodiment comprises a transparent panel of material, it will be appreciated that it is well within the scope of the invention for the separation member to assume a variety of other configurations. The only requirement is that the separation member 40 maintain the image member 20 and the shutter member 30 in a spaced relationship. With this, the separation member could comprise spaced panes of glass (not shown) or even a volume of air, water, or gas in combination with a means for retaining the image member 20 and the shutter member 30 in a spaced apart configuration such as a means for retaining the image and shutter members 20 and 30 by their edges (not shown).

In FIG. 3, it will be appreciated that the plurality of coded images 24, the plurality of shutter elements 34, and the transparent sheets 22 and 32 are shown for clarity in greatly exaggerated thickness. In reality, the plurality of coded images 24 and the plurality of shutter elements 34 comprise layers of printed ink that are of substantially negligible thickness, and the transparent sheets 22 and 32 will be paper thin (e.g., approximately 0.005 inches). With respect to the disk 40 of transparent material, a wide variety of thicknesses could well be employed. In one preferred embodiment, the disk 40 comprises a panel of clear acrylic with a thickness of approximately 0.15 inches.

Since the image member 20 and the shutter member 30 are each fixed to the disk 40, it will be clear that the coded images 24 and the shutter elements 34 are fixed relative to each other. With this, accurately aligning the plurality of coded images 24 with the plurality of shutter elements 34 during assembly of the visual display device 10 will ensure that they remain that way permanently. As a result, misalignment of the coded images 24 and the shutter elements 34 can be effectively avoided.

Again, one skilled in the art will be readily aware that the individual elements of the transparent sheets 22 and 32 could be eliminated, and the plurality of coded images 24 could be applied as by printing or the like directly to the first surface 25 of the disk 40 while the plurality of shutter elements 34 could be applied as by printing or the like directly to the second, opposing surface 27 of the disk 40. Under such an arrangement, the coded images 24 in combination with the first surface 25 of the disk 40 could be termed the image member 20, and the shutter elements 34 in combination with the second surface 27 of the disk could be termed the shutter member 30. In any event, such a visual display device 10 might be considered still more advantageous due to its further simplicity.

Furthermore, although it is not expressly shown, it is contemplated and well within the scope of the present invention to print the plurality of shutter elements 34 in opaque black while printing the plurality of coded images 24 in full color, ideally with semi-transparent inks to allow back light to pass therethrough. Such an embodiment advantageously would allow a display of images of varying and combined color patterns.

Figure 4:
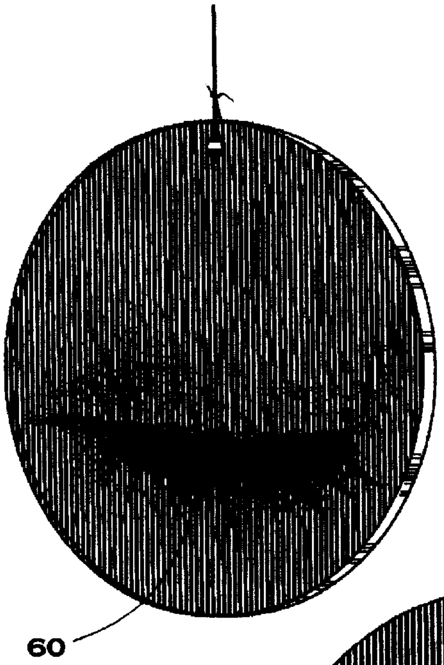
FIG. 4 is a perspective view of a visual display device with continuous animation according to the present invention in a first orientation displaying a first image.
Figure 5:
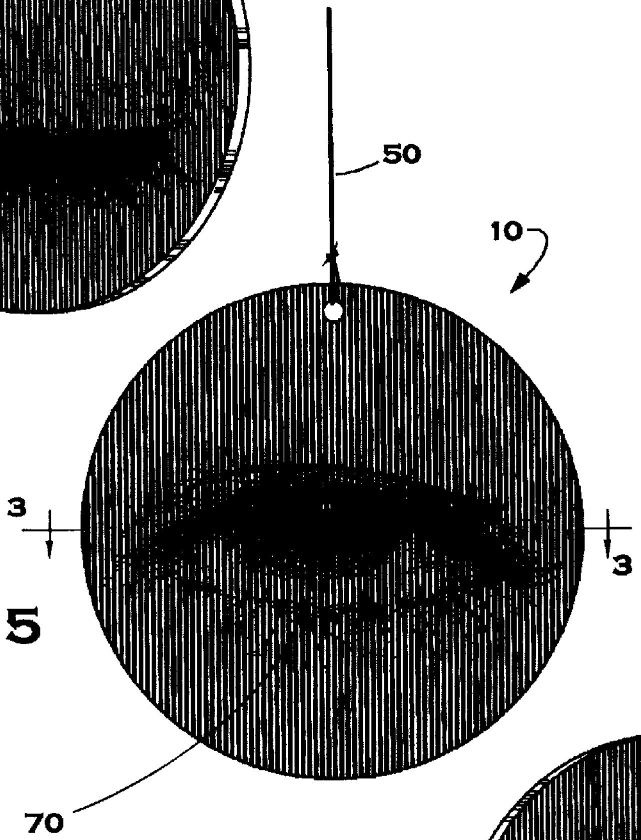
FIG. 5 is a perspective view of the visual display device of FIG. 4 in a second orientation displaying a second image.
Figure 6:
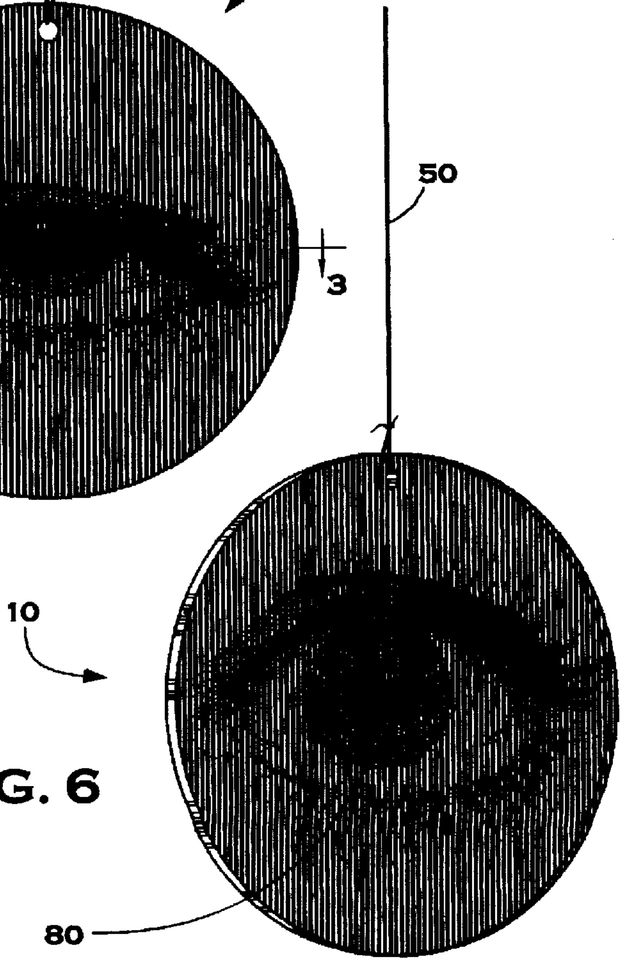
FIG. 6 is a perspective view of the visual display device of FIGS. 4 and 5 in a third orientation displaying a third image.

Turning next to FIGS. 4, 5, and 6, one sees a complete embodiment of the visual display device with continuous animation 10 experiencing a progressive counterclockwise rotation (as viewed from above) such that it displays a small portion of its continuous 360 degree rotation. In these figures, the visual display device 10 rotates about what again will be termed a polar axis that is parallel to the lengthwise orientation of the shutter elements 34 and the coded images 24.

In FIGS. 4, 5, and 6, the visual display device 10 is suspended by a means for suspending the visual display device 10 for continuous rotation, which in this embodiment comprises a strand 50 of flexible material such as monofilament, string, or the like. As such, the visual display device 10 can rotate freely in response to a force input, which could be in any form such as a push from a user's hand or an incident breeze, to induce a period of continuous animation. Ideally, the strand 50 of flexible material will retain the visual display device 10 at a location that is in vertical alignment with the center of gravity of the device 10 and in alignment with a common lengthwise orientation of the shutter elements 34, the coded images 24, and the viewing elements 36 whereby the visual display device 10 can rotate continuously with the plurality of shutter elements 34, the plurality of coded images 24, and the plurality of viewing elements 36 disposed generally vertically. Of course, it certainly is within the scope of the invention for continuous rotation of the visual display device 10 to be carried out by a motorized arrangement (not shown) or for the visual display device 10 to be supported by another means, such as an upstanding pole or the like (not shown).

In FIG. 4, the visual display device 10 is disposed at an angle relative to the viewer with the right edge of the visual display device 10 closest to the viewer. FIG. 5 shows the visual display device 10 slightly rotated relative to the viewer whereby the visual display device 10 is disposed generally perpendicularly to the viewer's line of sight. Finally, FIG. 6 shows the visual display device 10 progressively rotated to an orientation wherein the left edge of the visual display device 10 is closest to the viewer.

In FIG. 4, a first image 60 is displayed in the form of a closed eye. This first image 60 is created by the completion of one coded image 24 by the plurality of shutter elements 34. To do so, the shutter elements 34 bridge the gap between coded strips 23 of a first coded image 24 while shielding the portions of the remaining plurality of coded images 24 from view. With this, only the first image 60 can be seen.

Looking next to FIG. 5, the slightly rotated visual display device 10 is shown depicting a second image 70 in the form of an eye that is partly open. The second image 70 is created by the plurality of shutter elements 34 of the constituent strips of the next coded image 24 succeeding the coded image 24 that was completed to form the first image 60. At the same time, the plurality of shutter elements 34 perform their second function of shielding the remaining coded images 24 of the plurality of coded images including the coded image 24 that was completed to form the first image 60.

Next, FIG. 6 illustrates a third image 80 in the form of an eye that is wide open. The third image 80 is created by the completion by the plurality of shutter elements 34 of the next coded image 24 succeeding the coded image 24 that was completed to form the second image 70. Concomitantly, the plurality of shutter elements 34 shield from view all other coded images 24 of the plurality of coded images 24 including the coded images that were completed to form the first image 60 and the second image 70.

The astute observer will realize that this rotating embodiment of the visual display device 10 allows images such as the first, second, and third images 60, 70, and 80 to be seen clearly and distinctly from both sides of the visual display device 10. As such, the visual display device 10 of the present invention achieves a marked improvement over prior art coded image display devices, including lenticular display devices, which can be viewed clearly and distinctly from only one side. Although just three images 60, 70, and 80 are shown in FIGS. 4, 5, and 6, the present invention is able to display a greater number of images such as four, five, six, and even more images.

Figure 7A:
FIGS. 7A–7I are sequential views showing the visual display device of FIGS. 4, 5, and 6 through substantially one entire revolution.
Figure 7B:
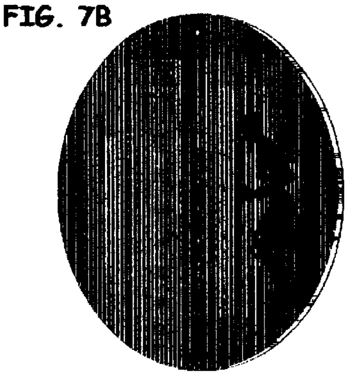
Figure 7C:
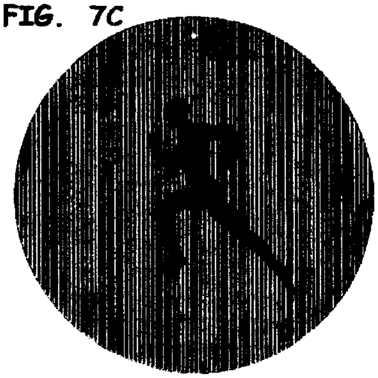
Figure 7D:
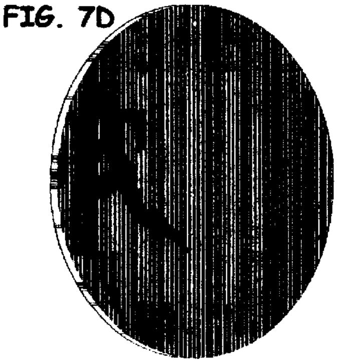
Figure 7E:
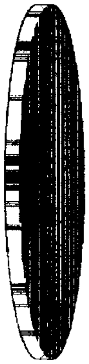
Figure 7F:
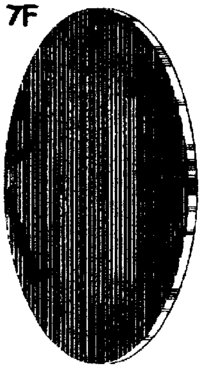
Figure 7G:
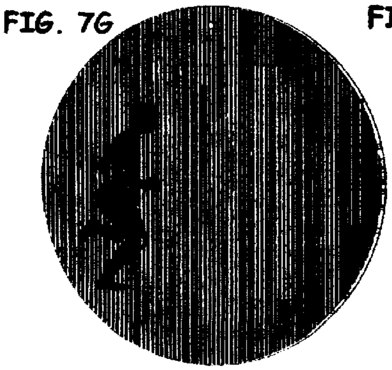
Figure 7H:
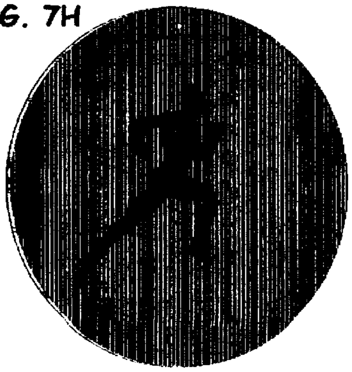
Figure 7I:
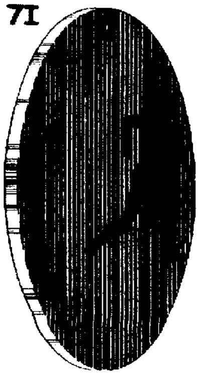

The visual display device already shown, for example, in FIGS. 3, 4, 5, and 6 is depicted again in FIGS. 7A through 7I in consecutive degrees of rotation. With this, FIGS. 7A through 7I further demonstrate the inherent ability of the aforedescribed structure to present images, such as the first, second, and third images 60, 70, and 80, that can be seen clearly and distinctly from both sides of the visual display device 10. Stated more particularly, if one assumes that an orientation orthogonal to the page comprises 0° of rotation, FIG. 7A shows the visual display device 10 at approximately 20° of rotation. FIGS. 7B through 7I go on to show the visual display device 10 rotated through approximately 60°, 100°, 140°, 180°, 220°, 260°, 300°, and 340° of rotation respectively.

The parallax displacement required for the invention to operate certainly can occur by rotation or other movement of the visual display device 10 as in the illustrated series of FIGS. 4, 5, and 6. Alternatively, spatial displacement can occur as a result of movement of the observer relative to the visual display device 10. As a result, the visual display device 10 could function while remaining still. Although it is not shown in the figures, this might be the case where a visual display device 10 according to the present invention is fixed in place, for example, on a storefront or as part of a billboard. This might be accomplished relative to storefronts in a number of ways such as, for example, affixing the plurality of coded images 24 to one side of a storefront's glass and affixing a plurality of shutter elements 34 to the second side of the storefront glass. With regard to such fixed display devices, it is contemplated that the surface to be viewed by an observer might be printed on a clear surface and then silhouetted against a well-lit background. With this, the display device 10 would create a luminous image that would be animated with the passing by of a viewer.

Relative to the embodiment of the invention shown in FIGS. 1–6, it should be noted that the plurality of coded images 24, the plurality of shutter elements 34, and the plurality of viewing elements 36 share a common lengthwise strip orientation. As a result, the displayed images can be viewed in an upright position by orienting the plurality of coded images 24, the plurality of shutter elements 34, and the plurality of viewing elements 36 generally vertically. As a result, each of the observer's eyes will view the visual display device 10 from a slightly different angle. However, since the visual display device 10 of this embodiment is intended to be viewed from relatively large distances, the difference in viewing angles is negligible.

With this, the shutter elements 34 and the coded images 24 can be crafted with substantially identical pitches whereby the coded images 24 can be seen with equal clarity and distinctness from both sides of the visual display device 10. As a result, the visual display device 10 enjoys added functionality beyond prior art display devices, which typically are viewable clearly from just one side. As has been discussed previously, the interchangeability of the first and second sides of the visual display device 10 is further served by the clear nature of the shutter member 20, which provides for a wholly silhouetted image display that is clearly cognizable from either side of the display device 10.

In light of the above, it becomes clear that the present invention achieves a plurality of advantages over prior art visual display devices. For example, the present invention exploits the principles of parallax displacement to provide a continuous, non-reversing animated sequence of displayed images to an observer. This advance over the prior art results largely from the fact that the image member 20 and the shutter member 30 of the present invention are completely interchangeable. With this, the visual display device 10 is capable of displaying images that are viewable with equal clarity and distinctness from both sides of the visual display device 10. As a result, a continuously rotating visual display device 10 according to the present invention will display clearly cognizable images throughout 360 degrees of rotation except, of course, for the brief moment when the edge of the visual display device passes by and faces the viewer. With this, the invention has many of the performance capabilities of more complex visual display devices, such as the zoetrope, the phenakistascope, and the praxinoscope, while being exceedingly simple in construction and use. Equally advantageously, the present visual display device 10 carries out its continuous animation while maintaining the coded images 24 and the shutter elements 34 in precise alignment. Still further, particularly when suspended by a string or the like, the invention can be retained and operated in an exceedingly simple and convenient manner, perhaps with no user intervention whatsoever. These and other advantages of the invention will be readily apparent to one who reviews the present specification and drawings and also to one who has the opportunity to enjoy the use of an embodiment of the present invention for a visual display device with continuous animation 10.

It will be clear that the present invention has been shown and described with reference to certain preferred embodiments that merely exemplify the broader invention revealed herein. Certainly, those skilled in the art can conceive of alternative embodiments. For instance, those with the major features of the invention in mind could craft embodiments that incorporate those major features while not incorporating all of the features included in the preferred embodiments. With the foregoing in mind, the following claims are intended to define the scope of protection to be afforded the inventor, and the claims shall be deemed to include equivalent constructions insofar as they do not depart from the spirit and scope of the present invention.

One must note that a plurality of the following claims may express certain elements as a means for performing a specific function, at times without the recital of structure or material. As the law demands, these claims shall be construed to cover not only the corresponding structure and material expressly described in this specification but also equivalents thereof.

I claim as deserving the protection of United States Letters Patent:

1. A visual display device for providing a substantially continuous, non-reversing animated sequence of displayed images to an observer, the visual display device comprising:

a separation member with a first surface and an opposing second surface;

a plurality of interposed coded images fixed to the first surface of the separation member to form an image member;

a plurality of shutter elements fixed to the second surface of the separation member; and a plurality of viewing elements interposed between the plurality of shutter elements whereby the shutter elements and the viewing elements together form a shutter member;

wherein the plurality of interposed coded images comprise N interposed coded images, wherein each interposed coded image is formed by a division of a complete image into sequences of N strips of substantially equal width, and then a removal of N-1 strips of each sequence thereby leaving 1 remaining strip from each sequence of N strips for each image, and wherein the remaining strips of the N interposed coded images are disposed in sequences of uninterrupted, ordered succession devoid of interposed elements thereby producing sequences of N interposed coded images with a width approximately equal to N multiplied by the width of each strip;

whereby the plurality of shutter elements selectively shield from view all but one of the plurality of interposed coded images while completing and uncoding one coded image of the plurality of coded images that is not shielded from view and whereby a progressive change in a viewing angle of an observer will cause a sequential revelation and completion and uncoding of further coded images of the plurality of coded images in a continuous, non-reversing manner.

2. The visual display device of claim 1 wherein the separation member comprises a substantially transparent panel.

3. The visual display device of claim 1 wherein the plurality of interposed coded images share a common orientation and a given pitch and wherein the plurality of shutter elements and the plurality of viewing elements share a common orientation and a given pitch.

4. The visual display device of claim 1 wherein the image member is transparent except for the plurality of coded images whereby the displayed images of the visual display device are wholly silhouetted and whereby the image member and the shutter member are interchangeable.

5. The visual display device of claim 1 further comprising a means for suspending the visual display device for continuous rotation whereby the visual display device can rotate continuously to provide substantially continuous animation.

6. The visual display device of claim 3 wherein the pitch of the plurality of interposed coded images is substantially equal to the pitch of the plurality of shutter elements and the plurality of viewing elements, wherein each of the plurality of shutter elements has a width approximately equal to the width of N-1 strips of the N interposed coded images, and wherein each of the plurality of viewing elements has a width approximately equal to the width of 1 strip of the N interposed coded images whereby the displayed images of the visual display device neither converge nor diverge and the displayed images can be viewed from both a first side and a second side of the visual display device without convergence or divergence.

7. The visual display device of claim 6 wherein the image member is transparent except for the plurality of coded images whereby the displayed images of the visual display device are wholly silhouetted and whereby the image member and the shutter member are completely interchangeable such that the displayed images can be viewed from both a first side and a second side of the visual display device.

8. The visual display device of claim 7 wherein the means for suspending the visual display device comprises a strand of flexible material.

9. The visual display device of claim 8 wherein the strand of flexible material is coupled to the separation member of the visual display device in alignment with a center of gravity of the separation member.

10. The visual display device of claim 9 wherein the plurality of shutter elements, the plurality of coded images, and the plurality of viewing elements share a common lengthwise orientation and wherein the strand of flexible material is coupled to the separation member to support the separation member in alignment with the common lengthwise orientation whereby the separation member can rotate continuously with the plurality of shutter elements, the plurality of coded images, and the plurality of viewing elements disposed generally vertically.

11. A visual display device for providing a substantially continuous, non-reversing animated sequence of displayed images to an observer, the visual display device comprising:

a separation member comprising a substantially transparent panel with a first surface and an opposing second surface;

a plurality of interposed coded images fixed to the first surface of the separation member to form an image member wherein the plurality of interposed coded images share a common orientation and a given pitch and wherein the image member is transparent except for the plurality of coded images whereby the displayed images of the visual display device are wholly silhouetted;

a plurality of shutter elements fixed to the second surface of the separation member; and a plurality of viewing elements interposed between the plurality of shutter elements whereby the shutter elements and the viewing elements together form a shutter member wherein the plurality of shutter elements and the plurality of viewing elements share a common orientation and a given pitch that is substantially equal to the pitch of the plurality of interposed coded images whereby the displayed images of the visual display device neither converge nor diverge;

wherein the plurality of interposed coded images comprise N interposed coded images, wherein each interposed coded image is formed by a division of a complete image into sequences of N strips of substantially equal width and then a removal of N-1 strips of each sequence thereby leaving 1 remaining strip from each sequence of N strips for each image, wherein the remaining strips of the N interposed coded images are disposed in sequences of uninterrupted, ordered succession devoid of interposed elements thereby producing sequences of N interposed coded images with a width of each sequence approximately equal to N multiplied by the width of each strip, wherein each of the plurality of shutter elements has a width approximately equal to the width of N-1 strips of the N interposed coded images, and wherein each of the plurality of viewing elements has a width approximately equal to the width of 1 strip of the N interposed coded images;

whereby the plurality of shutter elements selectively shield from view all but one of the plurality of interposed coded images while completing and uncoding one coded image of the plurality of coded images that is not shielded from view and whereby a progressive change in a viewing angle of an observer will cause a sequential revelation and completion and uncoding of further coded images of the plurality of coded images in a continuous, non-reversing manner and whereby the image member and the shutter member are completely interchangeable such that the displayed images can be viewed from both a first side and a second side of the visual display device.

12. The visual display device of claim 11 further comprising a means for suspending the visual display device for continuous rotation whereby the visual display device can rotate continuously to provide substantially continuous animation.

13. The visual display device of claim 12 wherein the means for suspending the visual display device comprises a strand of flexible material.

14. The visual display device of claim 13 wherein the strand of flexible material is coupled to the separation member of the visual display device in alignment with a center of gravity of the separation member.

15. The visual display device of claim 14 wherein the plurality of shutter elements, the plurality of coded images, and the plurality of viewing elements share a common lengthwise orientation and wherein the strand of flexible material is coupled to the separation member to support the separation member in alignment with the common lengthwise orientation whereby the separation member can rotate continuously with the plurality of shutter elements, the plurality of coded images, and the plurality of viewing elements disposed generally vertically.

* * * * *

UNITED STATES PATENT AND TRADEMARK OFFICE

CERTIFICATE OF CORRECTION

PATENT NO. : 6,286,873 B1
APPLICATION NO. : 09/383477
DATED : September 11, 2001
INVENTOR(S) : Rufus Butler Seder It is certified that error appears in the above-identified patent and that said Letters Patent is hereby corrected as shown below:

On the Cover Page: Please correct to show as follows:

--Related U.S. Application Data--

Item should read --(60) Provisional Application No. 60/097,896, filed on August 26, 1998.--

Col 1, insert the following after the title "Visual Display Device With Continous Animation" before the "Field of Invention" in Column 1, Line 4:

Title page, item [30] --PROVISIONAL PRIORITY CLAIM-- should read

--This application claims the benefit of U.S. Provisional Application No. 60/097,896, filed on August 26, 1998.--

Signed and Sealed this

First Day of May, 2007

JON W. DUDAS
*Director of the United States Patent and Trademark Office*